J. O. GRADY.
DEMOUNTABLE RIM.
APPLICATION FILED FEB. 27, 1917.
1,257,844.
Patented Feb. 26, 1918.
2 SHEETS—SHEET 1.
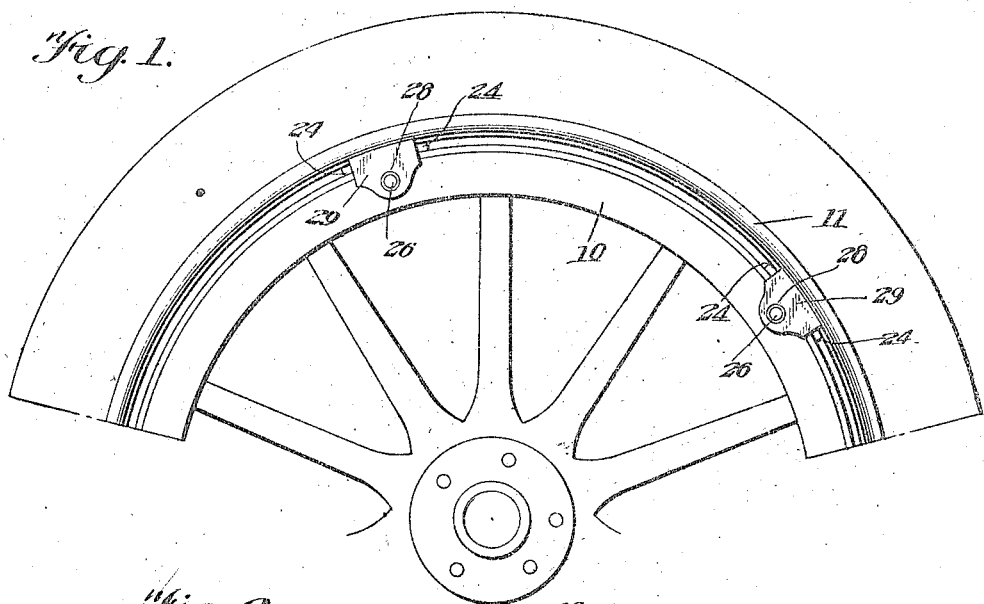
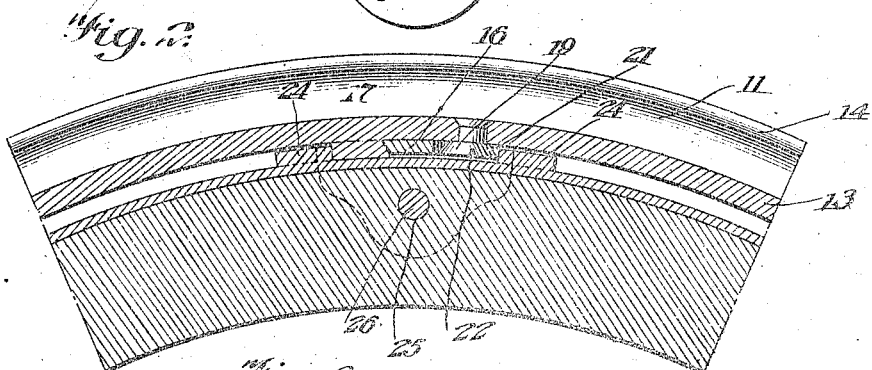
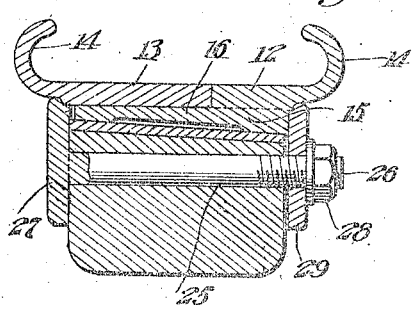
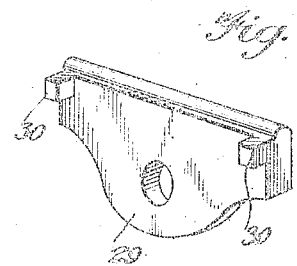
WITNESSES
INVENTOR
J. O. Grady,
BY Victor J. Evans,
ATTORNEY

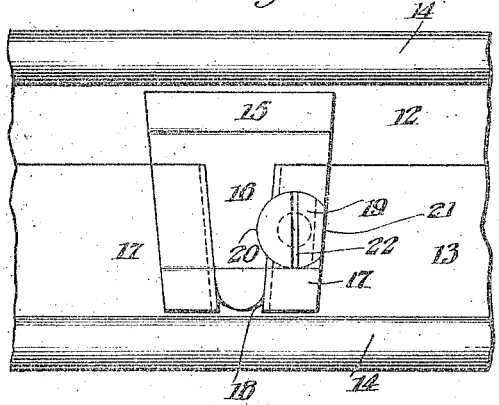
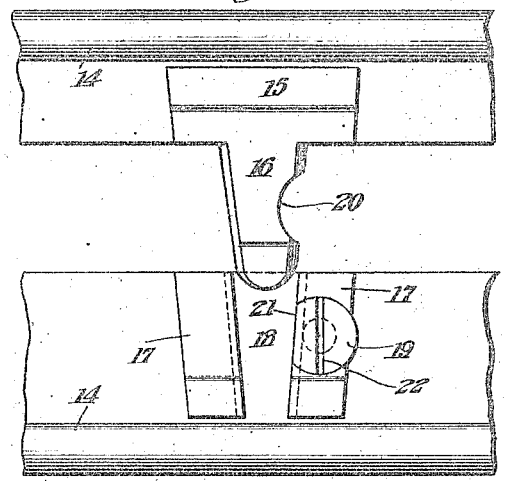
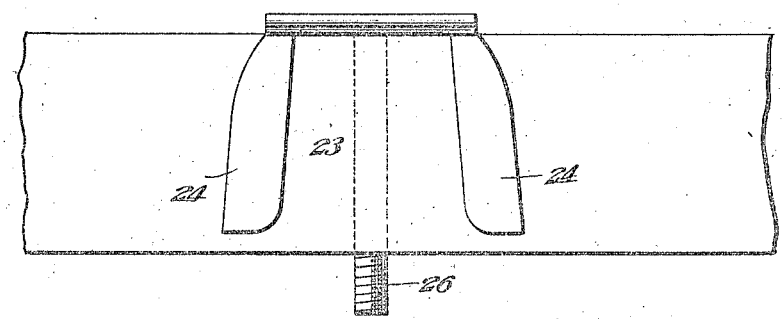
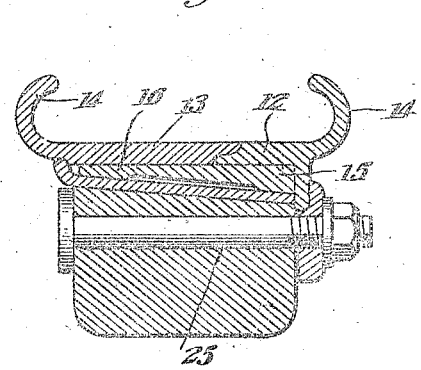
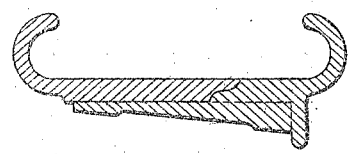

UNITED STATES PATENT OFFICE.

JOHN O. GRADY, OF BIRMINGHAM, ALABAMA.

DEMOUNTABLE RIM.

1,257,844. Specification of Letters Patent. Patented Feb. 26, 1918.

Application filed February 27, 1917. Serial No. 151,301.

*To all whom it may concern:*

Be it known that I, JOHN O. GRADY, a citizen of the United States, residing at Birmingham, in the county of Jefferson and State of Alabama, have invented new and useful Improvements in Demountable Rims, of which the following is a specification.

This invention relates to vehicle wheels and especially to demountable rims therefor.

The object of the present invention is to provide a demountable rim of novel construction which will enable a pneumatic or other tire to be attached thereto or removed therefrom with a minimum amount of time or labor.

Another object of the invention is to provide a demountable rim composed of interlocking sections, said sections being readily disassembled to permit the removal of the tire and when in their disassembled position will permit of their engagement with the tire, the said sections being then easily and readily assembled to provide for the attachment of the rim to a vehicle wheel.

A further object is to provide a sectional automobile rim with engaging means carried by each of the sections and means carried by said engaging rim for locking the sections together, this sectional engaging and locking means providing means coöperating with means carried by the felly of the wheel for locking the rim thereto and for preventing any independent rotary motion of the rim with respect to the wheel.

To this end the invention consists of a demountable rim comprising a pair of annular tire engaging sections, the said sections being provided with interlocking engaging elements, means for locking said elements in their engaged position, the said interlocking means coöperating with means carried by the felly of the wheel for preventing independent rotary movement of the rim and means for securing the said rim to the wheel.

In the drawings:—

Figure 1 is a side elevation of a portion of a vehicle wheel provided with a demountable rim constructed in accordance with the invention;

Fig. 2 is a longitudinal vertical sectional view of the same.

Fig. 3 is an enlarged cross sectional view through the felly and rim;

Fig. 4 is an inner plan view of a portion of a rim showing the interlocking elements in their engaged position.

Fig. 5 is a similar view with the sections of the rim separated;

Fig. 6 is a plan view of the felly illustrating the means coöperating with the sectional rim locking means for preventing rotary movement of the said rim;

Fig. 7 is a detailed perspective view of one of the locking washers or clamps carried by the felly, by means of which the rim is secured to the wheel;

Fig. 8 is a cross sectional view of a modified form of rim illustrating the flange for closing the space between the felly and rim, the said rim and felly being shown in engaged position; and Fig. 9 is a view of the same separated.

In the practical embodiment of the invention illustrated, the felly of the wheel is indicated at 10, the said felly being of any well known or desired construction. The demountable rim is shown at 11 and comprises a pair of annular sections 12 and 13. The sections herein shown are provided upon their edges with means indicated at 14 for engaging a tire of the clencher type, but it is of course understood that the rim may be formed to engage tires of other formation, such as the straight side tire. Secured upon the inner periphery of the section 12 are lugs 15, the said lugs being spaced around the rim any desired distance apart and being formed with laterally projecting tongues 16, the side edges of these tongues being preferably inclined as shown. The rim section 13 is provided with spaced lugs 17, there being a pair of these lugs for each of the tongues 16. The opposed edges of these lugs 17 are inclined as shown, for the purpose of providing tapered grooves 18, for engagement with the tongue 16 the said tongue being similarly tapered. The opposed edges of the lug 17 are also inclined to conform to the inclination of the tongue 16 and to provide a dove-tailed engagement therewith. A rotatable locking element 19 is provided for each of the grooves 18, the said element being swiveled in the section 13 and being adapted to extend within the said groove for the purpose of engaging a notch 20 formed in the tongue 16. The rotatable locking element 19 is preferably circular in form and is adapted to be seated within a socket formed in one of the lugs 18 and flush with the top thereof. This element 19 is provided with a straight face 21, which, when turned in the proper position will register with the notch 18 and permit the removal of the tongue 16 therefrom. The rotatable locking elements 19 are further provided with a kerf or slot 22, for the insertion of a screw driver or other tool, by means of which it may be readily operated.

The tongues 16 and notches 18 before described, provide interlocking engaging elements, by means of which the sections 12 and 13 may be secured together to form the rim. When the rim sections are in their assembled position, these interlocking elements form a substantially rectangular series of spaced lugs upon the inner periphery of the rim, and when so formed are adapted to engage sockets 23 formed upon the outer surface of the wheel felly. In order to provide these sockets, the felly 10 is provided with spaced lugs 24, and when these lugs are engaged with the rectangular locking elements, they will prevent any rotary movement of the rim with respect to the wheel.

The felly 10 is provided with transverse openings 25, located in juxtaposition to each of the sockets 23 and these openings are adapted to receive bolts 26, provided upon one end with a clamping member 27 and being threaded upon their opposite ends for the reception of nuts 28. A removable clamping member 29 is mounted upon the bolts 26 between the felly and the nuts 28 and is adapted to coöperate with the clamping member 27 for the purpose of securing the rim to the wheel. The removable clamping members 29 are each provided with laterally extending lugs 30, which are adapted to engage the sides of the lugs 17, to aid in fastening and holding the said members.

When it is desired to change the tire, the nuts 28 are loosened to permit the removal of the rim. The rotatable locking elements are then disengaged from the tongues 16, when the sections 12 and 13 may be separated and the tire easily and quickly removed therefrom, the rim being preferably laid flat with the section 12 uppermost. The new tire is then positioned upon the section 13 and the section 12 adjusted and secured thereon, the rim then being ready for positioning upon the wheel.

It is believed that the foregoing description when taken in connection with the accompanying drawings will be sufficient for a clear understanding of the construction, operation and advantages of the invention.

Having thus described the invention, what is claimed is:—

The combination with a vehicle wheel, of a demountable rim therefor, said rim comprising a pair of annular tire engaging sections, a plurality of laterally extending spaced beveled edge tongues secured to the inner periphery of one of said sections, said tongues being raised within the diameter of said sections, a plurality of spaced lugs arranged in pairs and carried by the other section, said lugs forming grooves for the reception of tongues in the first mentioned section and having their opposite edges beveled to conform to the beveled edges of said tongues and a rotatable element mounted within one lug of each pair of lugs and adapted to extend within a notch formed in each of the laterally extending tongues to prevent accidental disengagement of the tongues.

In testimony whereof I affix my signature.

JOHN O. GRADY.